United States Patent [19]

Griffin

[11] Patent Number: 4,956,238
[45] Date of Patent: Sep. 11, 1990

[54] MANUFACTURE OF CUTTING STRUCTURES FOR ROTARY DRILL BITS

[75] Inventor: Nigel D. Griffin, Whitminster, England

[73] Assignee: Reed Tool Company Limited, Newtownabbey, Northern Ireland

[21] Appl. No.: 204,688

[22] Filed: Jun. 9, 1988

[51] Int. Cl.$^5$ .............................................. B32B 9/00
[52] U.S. Cl. .................................. 428/408; 428/457; 428/698; 51/293; 51/295; 76/108.2; 148/476; 148/442; 278/263.13; 420/580; 175/329; 175/330; 175/374
[58] Field of Search ......................... 51/309, 293, 295; 428/627, 548, 408, 457, 698; 420/580; 175/329, 330, 374; 76/108 A; 228/263.13; 148/442, 426, 704

[56] References Cited

U.S. PATENT DOCUMENTS

| | | | |
|---|---|---|---|
| 4,508,257 | 4/1985 | Bose et al. | 228/263.13 |
| 4,593,776 | 6/1986 | Salesky et al. | 175/375 |
| 4,746,379 | 5/1988 | Rabinkin | 148/403 |
| 4,772,294 | 9/1988 | Schroeder | 51/309 |

FOREIGN PATENT DOCUMENTS 0722126 11/1965 Canada .
967151 8/1964 United Kingdom .

Primary Examiner—Stephen J. Lechert, Jr.
Assistant Examiner—Ngollan Mai
Attorney, Agent, or Firm—Browning, Bushman, Anderson & Brookhart

[57] ABSTRACT

A cutting structure, for a rotary drill bit, is of the kind comprising a preform cutting element having a front cutting face formed of superhard material, such as polycrystalline diamond, and a rear face bonded to a carrier of less hard material, such as cemented tungsten carbide. The cutting element is bonded to the carrier by means of an alloy having the following composition:
Ni about 30% to about 60%
Pd about 30% to about 62%
Si about 3% to about 15% wherein % is weight percent.

An alternative alloy has the following composition:
Cr about 4% to about 10%
Fe about 1% to about 5%
Si about 2% to about 7%
C about 0.01% to about 0.10%
B about 2% to about 5%
Ni Balance wherein % is weight percent.

3 Claims, 2 Drawing Sheets

MANUFACTURE OF CUTTING STRUCTURES FOR ROTARY DRILL BITS

BACKGROUND OF THE INVENTION

The invention relates to the manufacture of cutting structures for rotary drill bits for use in drilling or coring holes in subsurface formations.

In particular, the invention is applicable to cutting structures for rotary drill bits of the kind comprising a bit body having a shank for connection to the drill string and an inner passage for supplying drilling fluid to the face of the bit, the bit body carrying a plurality of cutting structures. Each cutting structure comprises a preform cutting element, often in the form of a circular disc, having a front cutting face formed of polycrystalline diamond or other superhard material and a rear face bonded to a carrier of hard, but not superhard, material such as cemented tungsten carbide, the carrier being in turn mounted on the bit body.

Usually, but not essentially, each preform cutting element is a polycrystalline diamond compact comprising two layers: a hard facing layer formed of the polycrystalline diamond, and a backing layer formed of hard, but not superhard, material, usually cemented tungsten carbide, the two layers being bonded together during formation of the cutting element in a high pressure, high temperature forming press.

In one common form of drill bit of the above mentioned type, the carrier comprises a stud or post to which the preform is bonded, the stud or post being received and secured within a socket in the bit body.

In one common method of making such a bit body, the body, or the outer portion thereof, is formed from an infiltrated tungsten carbide matrix by a powder metallurgy process. In this process a hollow mould is first formed, for example from graphite, in the configuration of the bit body or a part thereof. The mould is packed with powdered material, such as tungsten carbide, which is then infiltrated with a metal binder alloy, such as a copper alloy, in a furnace so as to form a hard matrix. Formers are normally mounted on the interior surface of the mould so as to define in the finished bit body the aforementioned sockets to receive the studs of the cutting structures. In matrix-bodied bits the studs are usually brazed into their sockets.

In another common form of drill bit, the bit body is machined from steel and the sockets are machined in the bit body. In this case the studs of the cutting structures are often shrink-fitted into the sockets, but they may also be brazed in the sockets.

Conventional two-layer preform cutting elements of the kind referred to above are only thermally stable up to a temperature of about 700° to 750° C. Due to this limitation, problems have arisen in bonding the preforms sufficiently securely to the stud or post. The preforms are normally bonded to the stud or post by brazing and, generally speaking, the strength of a brazed joint depends on the liquidus temperature of the braze alloy—the higher the liquidus temperature the greater the strength. Accordingly, if the brazing is carried out at a temperature which the preform can withstand, the resultant brazed joint may not be sufficiently strong to resist the substantially mechanical forces to which it is subjected during drilling. The problem may also be worsened due to the bond suffering from a significant loss of strength, for example through cracking, when it is reheated for brazing the post or stud into the drill bit body. The joint may also fail as a result of high temperatures reached during drilling.

In order to enable higher temperature brazing processes to be employed, sophisticated cooling techniques have been developed to protect the two-layer preform from the high temperature at which brazing takes place. Such techniques are described for example in U.S. Pat. Nos. 4,225,322, 4,319,707 and 4,527,998. One such technique is sometimes referred to as "LS Bonding".

The last-mentioned patents refer to various high temperature braze alloys which may be used with the bonding methods described. A commonly used alloy is a copper-based brazing alloy sold under the trade name "COCUMAN". Such known brazing alloys, however, can still suffer from the problems mentioned above, in spite of the use of the LS bonding method, and in particular the loss of strength when re-heated for brazing the cutting structure into the drill bit body. For example, when "COCUMAN" is used as a brazing alloy the bond may initially have a strength of the order of $60 \times 10^3$ psi. However, after the cutting structure has been braze fitted to the bit body the strength may have fallen to something of the order of $40 \times 10^3$ psi, which is inadequate. It is desirable that the bond strength should be a minimum of $60 \times 10^3$ psi after the cutting structure has been braze fitted to the bit body.

It might be thought advantageous to have bond strengths well in excess of $60 \times 10^3$ psi, but this is not as obvious as it might at first appear. The mechanisms employed to strengthen materials are based on limiting dislocation movement and, as a result, deformation and toughness are also limited. Very strong, but brittle, alloys could thus fail in service under impact conditions instead of in the ductile failure mode which currently prevails. Hence, toughness is a second important requirement for any new bonding alloy for bonding cutters to their carriers.

Various bonding alloys providing higher strengths than "COCUMAN" have been developed but without notable success. For example, European Patent Specification No. 0,213,300 describes brazing alloys containing boron. These alloys have a claimed strength of the order of $100 \times 10^3$ psi, i.e. nearly twice the strength of "COCUMAN". However, bonded structures using such alloys have still been found to fail in service. Although the mechanism has not been established with certainty, it is believed that the boron within the braze alloy reacts with the cemented carbide carrier to which the cutter is brazed, thereby reducing the strength and toughness of the bonded assembly, which may lead to failure in service.

The present invention sets out to provide an improved method of manufacturing cutting structures using an improved bonding alloy.

SUMMARY OF THE INVENTION

According to one aspect of the invention there is provided a method of forming a cutting structure, for a rotary drill bit, of the kind comprising a preform cutting element having a front cutting face formed of superhard material and a rear face bonded to a carrier of less hard material, the method comprising bonding the cutting element to the carrier by means of an alloy having the following composition:
Ni about 30% to about 60%
Pd about 30% to about 62%
Si about 3% to about 15% wherein % is weight percent.
Preferred ranges are as follows:
Ni about 38% to about 50%
Pd about 40% to about 55%
Si about 5% to about 9%
wherein % is weight percent.

An alloy having the following chemical analysis (supplied by Allied Metglas Products under the reference MBF 1005) has been found to be particularly advantageous.
Ni about 47.2%
Pd about 46.7%
Si about 6.1%
wherein % is weight percent.

The alloy is relatively hard, which means that it cannot be rolled to produce a foil suitable for brazing. The only method presently known of producing a thin foil is to cast the alloy onto a rotating chilled copper cylinder. This method causes the alloy to cool at a rate exceeding $10^6$°C./second, which produces a supercooled, non-crystalline solid, having the same amorphous atomic arrangement as the molten alloy.

A great benefit of this alloy for LS bonding is its low bonding temperature which is lower than that of "COCUMAN", combined with its high strength after having been submitted to a brazing thermal cycle. This becomes increasingly important as the size and complexity of polycrystalline diamond cutters increase and LS bonding becomes consequently more difficult.

The alloy according to this aspect of the invention is particularly suitable for the LS bonding of polycrystalline diamond cutters exceeding 14 mm in diameter. Although the alloy is more costly than "COCUMAN" its cost is still of little significance in relation to the cost of the cutter.

According to the second aspect of the invention there is provided a method of forming a cutting structure, for a rotary drill bit, of the kind comprising a preform cutting element having a front cutting face formed of superhard material and a rear face bonded to a carrier of less hard material, the method comprising bonding the cutting element to the carrier by means of an alloy having the following composition:
Cr about 4% to about 10%
Fe about 1% to about 5%
Si about 2% to about 7%
C about 0.01% to about 0.10%
B about 2% to about 5%
Ni Balance
wherein % is weight percent.

In a preferred form (supplied by Allied Metglas Products under the reference MBF 20) the alloy has the following chemical analysis:
Cr about 7.0%
Fe about 3.0%
Si about 4.5%
C about 0.06%
B about 3.2%
Ni Balance
wherein % is weight percent.

DETAILED DESCRIPTION OF THE PREFERRED EMBODIMENTS

Figure 1:
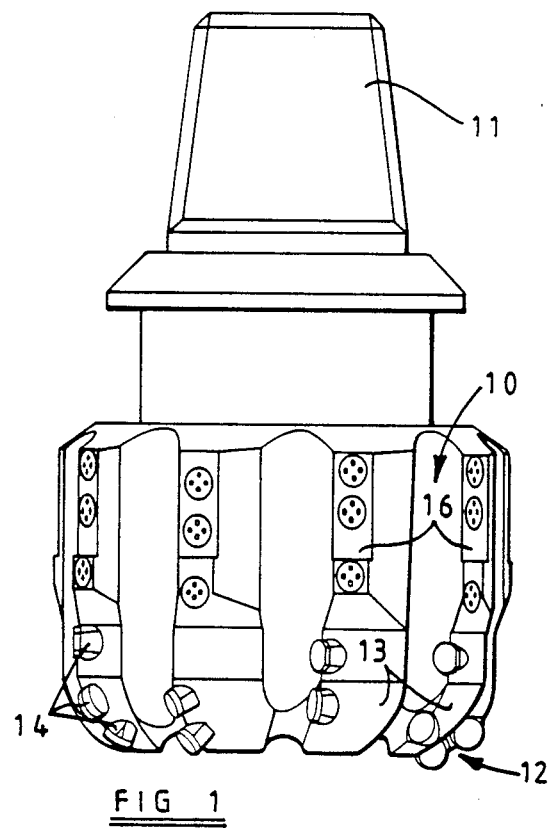
FIG. 1 is a side elevation of a typical drill bit in which cutting structures manufactured according to the invention may be used.
Figure 2:
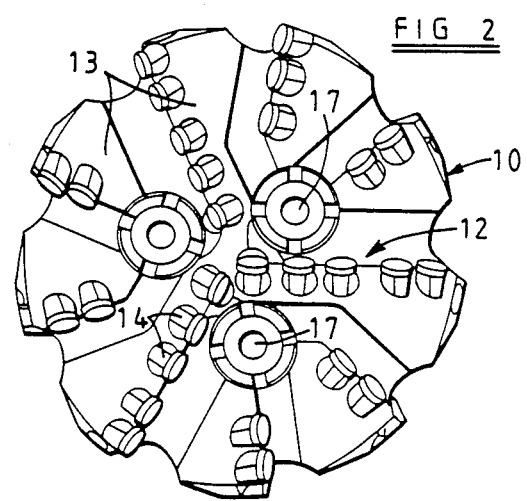
FIG. 2 is an end elevation of the drill bit shown in FIG. 1.

FIGS. 1 and 2 show a typical full bore drill bit of a kind to which cutting structures manufactured according to the present invention are applicable. The bit body 10 is machined from steel and has a threaded shank 11 at one end for connection to the drill string. The operative end face 12 of the bit body is formed with a number of blades 13 radiating from the central area of the bit, and the blades carry cutting structures 14 spaced apart along the length thereof. The bit has a gauge section including kickers 16 which contact the walls of the borehole to stabilise the bit in the borehole. A central passage (not shown) in the bit body and shank delivers drilling fluid through nozzles 17 in the end face 12 in known manner.

Figure 3:
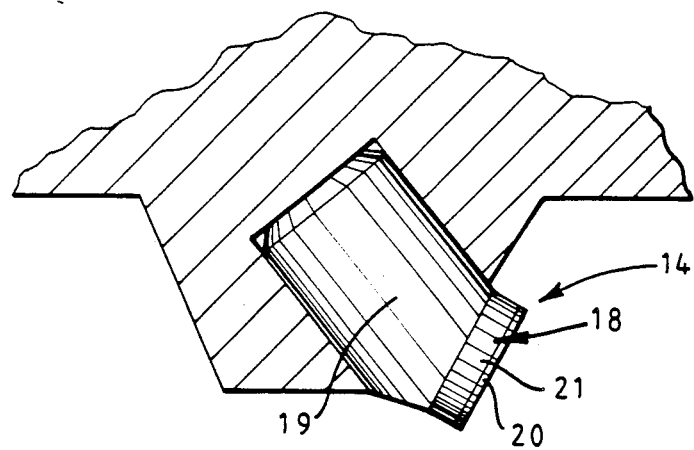
FIG. 3 is a side elevation of a typical cutting structure of the kind to which the invention relates.

As shown in greater detail in FIG. 3, each cutting structure 14 comprises a preform cutting element 18 mounted on a carrier 19 in the form of a stud which is located in a socket in the bit body. Each preform cutting element is in the form of a circular tablet comprising a thin facing layer 20 of polycrystalline diamond bonded to a backing layer 21, both layers being of uniform thickness. The rear surface of the backing layer is bonded to a suitably orientated surface on the stud.

It will be appreciated that the drawings illustrate only one example of the many possible variations of the type of bit and cutting structure to which the invention is applicable and many other arrangements are possible. For example, the bit body, instead of being machined from steel may be moulded from tungsten carbide matrix infiltrated with a binder alloy. Also, instead of the cutting element being a two-layer preform, it may comprise a unitary tablet of thermally stable polycrystalline diamond material.

In accordance with the invention, the preform cutting element 18 may be bonded to the stud 19, using essentially conventional bonding techniques, but using a bonding alloy of any of the kinds referred to previously as being in accordance with the invention.

In a particular example, following such bonding, alloys in accordance with the above preferred forms of each aspect of the invention (i.e. those identified above as MBF 1005 and MBF 20) were tested against "COCUMAN" and three other available bonding alloys. The results are set out in Table 1. The other alloys tested were as follows:

| | |
|---|---|
| NiP plated | Nickel-phosphorus alloy in accordance with the preferred composition described in co-pending British Patent Application No. 8609352 |
| R146 | Alloy according to U.S. Patent Specifiction No. 4,527,998 |
| MBF 1002 | Alloy according to European Patent Specification No. 0,213,300 |

All the alloys tested were used in an LS bonding process to establish the optimum bonding temperature for that alloy. This is in many respects of more significance than the melting range of the alloy.

Table 1 shows the bond shear strength of the following LS bonded structures:

(a) Plain carbide dummy cutters LS bonded to tungsten carbide studs, tested at ambient temperature.

(b) Polycrystalline diamond compact cutters LS bonded to tungsten carbide studs, tested at ambient temperature.

(c) Cutters bonded according to (b), tested at a temperature of 450°.

(d) Cutters bonded according to (b), tested after having been subjected to a simulated brazing thermal cycle.

After stage (d) a number of bond alloys were eliminated due to inferior strength test results. Hence, a restricted number of bond alloys were impact tested.

The impact tests were performed on two samples of each alloy used in LS bonding polycrystalline diamond compact cutters to tungsten carbide posts. Each structure was impacted at successively increasing impact energy levels until bond failure occurred. The impact energy levels used were 10, 20, 30, 40, and 50 joules.

Shear strength results at ambient temperature may not be the most relevant to service conditions, which is why the tests were repeated at 450° C. It was noted that at 450° some bonds appeared to be stronger than identical bonds tested at ambient temperature. This may be due to a number of effects, including experimental scatter, but is thought to be caused by a reduction in the bi-metallic induced tensile stress across the bond.

It will be noted from the results set out in Table 1 that the two alloys in accordance with the present invention, MBF 1005 and MBF 20, have outstanding attributes for LS bonding.

TABLE 1

| ALLOY | MELT RANGE °C. | BOND TEMP °C. | SHEAR STRENGTH KN AVERAGE | | | | IMPACT ENERGY JOULES | FLOWABILITY |
| --- | --- | --- | --- | --- | --- | --- | --- | --- |
| | | | PLAIN NC | PDC NC | PDC NC 450° C. | PDC NC AFTER BRAZE CYCLE | | |
| COCUMAN | 915/935 | 940 | 80 | 60 | 20 to 60 | 40 | 30 | Good |
| NL NiP PLATED | 880 | 940 | 99 | 78 | 82 | 80 | 30 | V. Fluid |
| R 146 | 970/1005 | 990 | 100 | 70 | 60 | 75 | — | Good |
| MBF 20 | 970/1000 | 990 | 95 | 102 | 105 | 95 | 50 | Good |
| MBF 1002 | 935/1000 | 960 | 118 | 90 | 100 | 95 | 50 | Good |
| MBF 1005 | 810/850 | 910 | 110 | 112 | 108 | 100 | 50+ | Poor |

I claim:

1. A cutting structure, for a rotary drill bit, comprising a preform cutting element having a front cutting face formed of superhard polycrystalline diamond material and a rear face bonded to a carbide carrier of less hard material, the cutting element being bonded to the carrier by means of an alloy having the following composition:
   Ni about 30% to about 60%
   Pd about 30% to about 62%
   Si about 3% to about 15%
wherein % is weight percent.

2. A cutting structure according to claim 1, wherein the bonding alloy has the following composition:
   Ni about 38% to about 50%
   Pd about 40% to about 55%
   Si about 5% to about 9%
wherein % is weight percent.

3. A cutting structure according to claim 2, wherein the alloy has the following composition:
   Ni about 47.2%
   Pd about 46.7%
   Si about 6.1%
wherein % is weight percent.

* * * * *